US009668465B2

United States Patent
Niitsuma et al.

(10) Patent No.: US 9,668,465 B2
(45) Date of Patent: Jun. 6, 2017

(54) DUAL-BEARING REEL

(71) Applicant: Shimano Inc., Sakai, Osaka (JP)

(72) Inventors: Akira Niitsuma, Osaka (JP); Takeshi Ikuta, Osaka (JP); Kunio Takechi, Osaka (JP); Takuji Takamatsu, Osaka (JP); Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/099,162

(22) Filed: Apr. 14, 2016

(65) Prior Publication Data

US 2016/0345560 A1 Dec. 1, 2016

(30) Foreign Application Priority Data

May 27, 2015 (JP) ................................. 2015-107019

(51) Int. Cl.
*A01K 89/01* (2006.01)
*A01K 89/015* (2006.01)
*A01K 89/0155* (2006.01)
*F16C 19/54* (2006.01)

(52) U.S. Cl.
CPC ...... *A01K 89/0187* (2015.05); *A01K 89/0155* (2013.01); *F16C 19/54* (2013.01)

(58) Field of Classification Search
CPC .... A01K 89/033; A01K 89/045; A01K 89/05; A01K 89/056; A01K 89/057; A01K 89/059
See application file for complete search history.

(56) References Cited

U.S. PATENT DOCUMENTS

| 3,000,477 A | * | 9/1961 | Dunn | A01K 89/033 188/72.1 |
| 4,056,246 A | * | 11/1977 | Purcell | A01K 89/033 242/270 |
| 4,133,499 A | * | 1/1979 | Purcell | A01K 89/033 242/270 |
| 5,417,377 A | * | 5/1995 | Park | A01K 89/033 188/329 |
| 5,984,221 A | * | 11/1999 | Kim | A01K 89/033 188/185 |

(Continued)

FOREIGN PATENT DOCUMENTS

| GB | 2116811 A | * | 10/1983 | ........... A01K 89/033 |
| JP | 9-275861 A | | 10/1997 | |

*Primary Examiner* — Emmanuel M Marcelo
(74) *Attorney, Agent, or Firm* — Global IP Counselors, LLP

(57) ABSTRACT

A dual-bearing reel, includes a reel body, a handle, a spool, a spool shaft, a friction material an operating portion. The reel body has a first reel body portion and a second reel body portion. The handle is attached to the first reel body portion. The spool is disposed between the first reel body portion and the second reel body portion. The spool shaft is configured to integrally rotate with the spool. The friction material is configured to brake rotation of the spool shaft by frictional force. The operating member is rotatably disposed about the spool shaft in the second reel body portion, a portion of the operating member being exposed from an outer perimeter surface of the second reel body portion, and the operating member is configured to adjust the braking force by the first friction material by being rotated.

7 Claims, 5 Drawing Sheets

(56) References Cited

U.S. PATENT DOCUMENTS

| | | | | |
|---|---|---|---|---|
| 2005/0253006 A1* | 11/2005 | Ikuta | ............... | A01K 89/033 |
| | | | | 242/245 |
| 2006/0016924 A1* | 1/2006 | Hirayama | ............ | A01K 89/006 |
| | | | | 242/245 |
| 2010/0006689 A1* | 1/2010 | Ikuta | ............... | A01K 89/033 |
| | | | | 242/306 |
| 2011/0011967 A1* | 1/2011 | Takechi | ............ | A01K 89/033 |
| | | | | 242/302 |
| 2012/0248233 A1* | 10/2012 | Saito | ............... | A01K 89/0155 |
| | | | | 242/289 |
| 2013/0075512 A1* | 3/2013 | Takechi | ............ | A01K 89/0155 |
| | | | | 242/283 |
| 2013/0126652 A1* | 5/2013 | Takechi | ............ | A01K 89/006 |
| | | | | 242/283 |

* cited by examiner

DUAL-BEARING REEL

CROSS-REFERENCE TO RELATED APPLICATIONS

This application claims priority based on Japanese Patent Application No. 2015-107019, filed in the Japan Patent Office on May 27, 2015, the contents of each of which is hereby incorporated herein by reference.

BACKGROUND

Field of the Invention

The present invention relates to a dual-bearing reel.

Background Information

In the dual-bearing reel disclosed in Japanese Laid-Open Patent Publication No. 1997-27586, an operating lever and a handle are attached to a reel body portion. The braking force with respect to the rotation of the spool shaft can be adjusted by pivoting this operating lever.

SUMMARY

In a dual-bearing reel such as that described above, the operating lever cannot be operated while palming. Thus, the object of the present invention is to provide a dual-bearing reel in which it is possible to operate an operating member while palming.

The dual-bearing reel according to one aspect of the present invention comprises a reel body, a handle, a spool, a spool shaft, a friction material, and an operating member. The reel body comprises a first reel body portion and a second reel body portion. The handle is attached to the first reel body portion. The spool is disposed between the first reel body portion and the second reel body portion. The spool shaft is integrally rotatable with the spool. The friction material brakes the rotation of the spool shaft by fractional force. The operating member is rotatably disposed about the spool shaft in the second reel body portion. Further, a portion of the operating member is exposed from the outer perimeter surface of the second reel body portion. The braking force by the friction material is adjusted by rotating the operating member.

According to this configuration, since a portion of the operating member is exposed from the outer perimeter surface of the second reel body portion, it is possible to operate this exposed operating member while palming.

Preferably, the operating member comprises a rotating member and a gear member. The rotating member is rotatably disposed about the spool shaft. Further, the rotating member comprises a gear portion on the outer perimeter surface thereof. The gear member meshes with the gear portion of the rotating member, and a portion thereof is exposed from the outer perimeter surface of the second reel body portion.

Preferably, the rotating member is attached to the second reel body portion in the axial direction.

Preferably, the operating member comprises a rotating portion and a lever portion. The rotating portion is rotatably disposed about the spool shaft. The lever portion extends from the rotating portion a radially outward direction. Further, a part of the lever portion is exposed from the outer perimeter surface of the second reel body portion.

Preferably, the rotating portion of the operating member is attached to the second reel body portion in the axial direction.

Preferably, the dual-bearing reel further comprises a one-way clutch that is attached to the spool shaft in the second reel body portion. The one-way clutch comprises an outer ring and a rolling body. The outer ring is capable of being braked by the friction material. The rolling body transmits the rotation of the spool shaft in the line delivering (casting) direction to the outer ring. The friction material brakes the rotation of the outer ring by frictional force.

According to this configuration, if the spool shaft is rotated in the casting direction, the rotation of the spool shaft is transmitted to the outer ring via the rolling body. That is, the spool shaft and the outer ring are rotated in conjunction. Since the outer ring is braked by the friction material the spool shaft is also braked thereby. As a result, the rotation speed of the spool shaft is suppressed at the time of casting to prevent backlash. On the other hand, if the spool shaft is rotated in the line winding (reeling) direction, the rotation of the spool shaft is not transmitted to the outer ring. That is, since the spool shaft and the outer ring are not rotated in conjunction, the spool shaft is not braked. Accordingly, it is possible to suppress the generation of rotational resistance in the spool shaft at the time of reeling, and the spool shaft can be rotated smoothly.

Preferably, the friction material is sandwiched by the outer ring and the operating member in the axial direction.

According to the present invention, it is possible to operate an operating member while palming.

BRIEF DESCRIPTION OF THE DRAWINGS

Referring now to the attached drawings which form a part of this original disclosure.

DETAILED DESCRIPTION OF THE EMBODIMENTS

Embodiments of a dual-bearing, reel according to the present invention will be described below, with reference to the drawings. Meanwhile, the axial direction is the direction in which the spool shaft extends. Further, the radial direction is the radial direction of a circle having the spool shaft as the center thereof, and the circumferential direction is the circumferential direction of the circle having the spool shaft as the center thereof.

Figure 1:
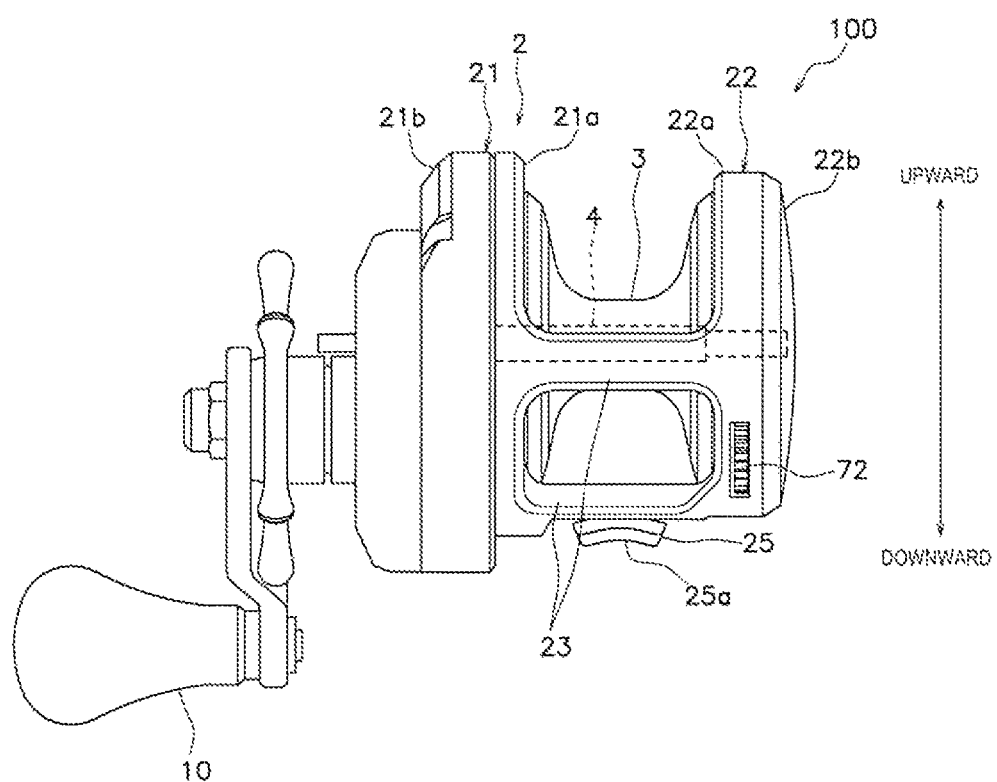
FIG. 1 is a front view of a dual bearing reel.
Figure 2:
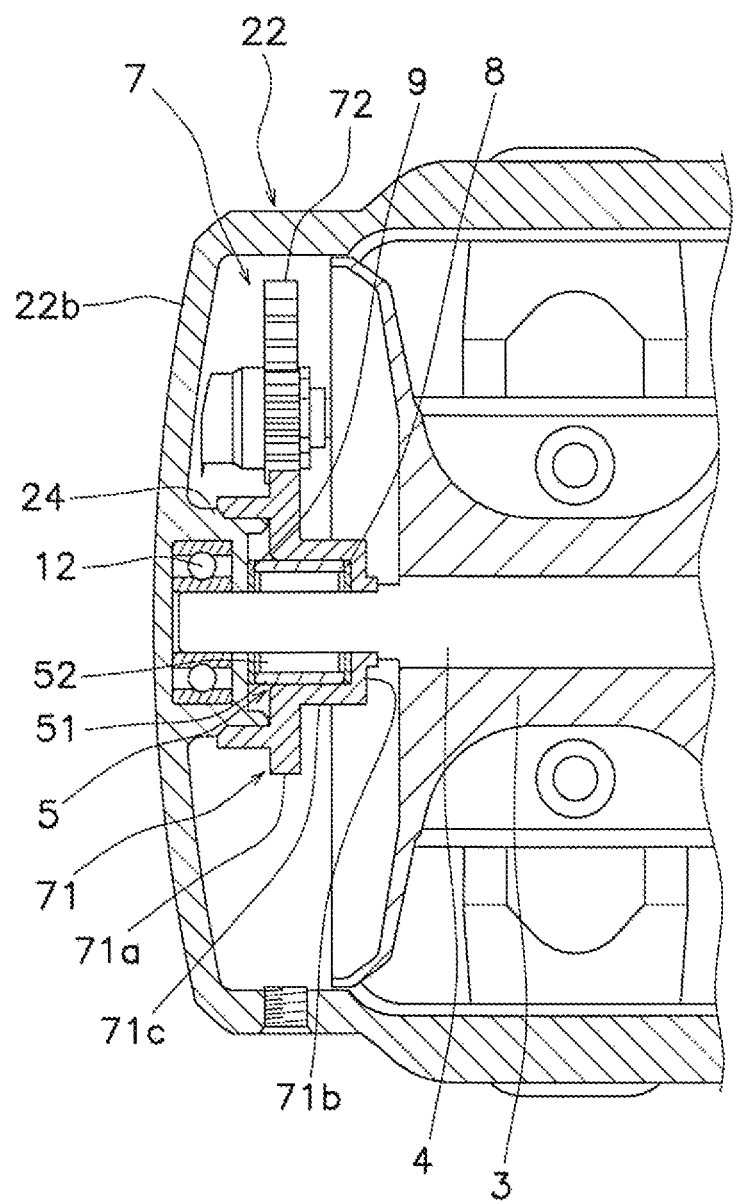
FIG. 2 is a cross-sectional view of the dual bearing reel of FIG. 1.

As shown in FIG. 1 and FIG. 2, the dual-bearing reel 100 comprises a reel body 2, a spool 3, a spool shaft 4, a one-way clutch 5, and an operating member 7. The dual-bearing reel 100 further comprises a first friction material 8, a second friction material 9, and a handle 10.

As shown in FIG. 1, the reel body 2 comprises a first reel body portion 21 and a second reel body portion 22. The first reel body portion 21 and the second reel body portion 22 are disposed at an interval from each other in the axial direction. The first reel body portion 21 and the second reel body portion 22 are coupled to each other via multiple connecting members 23.

The first reel body portion 21 comprises a first side plate 21a and a first side cover 21b. The first reel body portion 21 defines a housing space inside. A rotation transmission mechanism (not shown) configured to transmit the rotation, of the handle 10 to the spool shaft 4, and the like, are housed in this housing space. The second reel body portion 22 comprises a second side plate 22a and a second side cover 22b. The first side plate 21a and the second side plate 22a are coupled to each other via the connecting members 23. The first side plate 21a, second side plate 22a, and connecting members 23 are integrally formed, and form a frame of the reel body 2.

As shown in FIG. 2, the second reel body portion 22 further comprises an attaching portion 24 therein. The attaching portion 24 has a cylindrical shape and extends in the axial direction. In particular, the attaching portion 24 extends from the second cover 22b axially inwardly. A male threaded portion is formed on the outer perimeter surface of the attaching portion 24. A rotating member 71 (described below) is attached to this attaching portion 24. The attaching portion 24 houses an axle bearing member 12. The attaching portion 24 rotatably supports the spool shaft 4 via the axle bearing member 12.

As shown in FIG. 1, the reel body 2 further comprises a fishing rod mounting portion 25. The fishing rod mounting portion 25 comprises a mounting surface 25a. When the dual-bearing reel 100 is mounted to a fishing rod, the mounting surface 25a comes in contact with the fishing rod. The direction in which this mounting surface 25a is oriented shall hereinbelow be called "downward." Further, the direction that is opposite of the direction in which this mounting surface 25a is oriented shall hereinbelow be called "upward."

The spool 3 is disposed between the first reel body portion 21 and the second reel body portion 22. In particular, the spool 3 extends in the axial direction having a substantially cylindrical shape. The spool 3 is rotatable relative to the reel body 2. The spool 3 is rotatably supported to the reel body 2 via the spool shaft 4.

The spool shaft 4 is integrally rotatable with the spool 3. The spool shaft 4 is rotatably supported by the first reel body portion 21 and the second reel body portion 22. The spool shaft 4 is rotatably supported by the first main body portion 21 and the second main body portion 22 via the axle bearing member 12.

As shown in FIG. 2, the one-way clutch 5 is attached to the spool 4 in the second reel body portion 22. The one-way clutch 5 comprises an outer ring 51 and multiple rolling bodies 52. The outer ring 51 is rotatable-relative to the reel body 2. In particular, the outer ring 51 is rotatable relative to the attaching portion 24 and the rotating member 71. The outer ring 51 is disposed with a gap between the inner perimeter surface of the rotating member 71.

The outer ring 51 is capable of being braked by the first friction material 8 and the second friction material 9. In particular, the outer ring 51 is sandwiched between the first friction, material 8 and the second friction material 9 in the axial direction. That is, the rotation of the outer ring 51 is braked by the frictional force of the first and second friction materials 8, 9.

The rolling body 52 is disposed between the spool shaft 4 and the outer ring 51. The rolling body 52 transmits the rotation of the spool shaft 4 in the line delivering direction to the outer ring 51. On the other hand, the rolling body 52 does not transmit the rotation of the spool shaft 4 in the line winding direction to the outer ring 51.

The first and second friction materials 8, 9 brake the rotation, of the spool shaft 4 by fractional force. In particular, the first and second friction, materials 8, 9 indirectly brake the rotation of the spool shaft 4 in the line delivering direction, by braking the rotation of the outer ring 51 by frictional force. The first and second friction materials 8, 9 sandwich the outer ring 51 in the axial direction.

The first friction material 8 has an annular shape, and the spool shaft 4 extends through the first friction material 8. The first friction material 8 is sandwiched by the operating member 7 and the outer ring 51 of the one-way clutch 5, in the axial direction. In particular, one surface of the first friction material 8 is in contact with the outer ring 51 of the one-way clutch 5. Meanwhile, the first friction material 8 is not in contact with the rolling body 52 of the one-way clutch. Further, the other surface of the first friction material 8 is in contact with a disc portion 71b of a rotating member 71 in the operating member 7. The first friction material 8 is, for example, made of carbon cloth.

The second friction material 9 has an annular shape, and the spool shaft 4 extends through the second friction material 9. The second friction material 9 is sandwiched by the attaching portion 24 and the outer ring 51 of the one-way clutch 5, in the axial direction. In particular, one surface of the second friction material 9 is in contact with the attaching portion 24. The other surface of the second friction material 9 is in contact with the outer ring 51 of the one-way clutch 5. Meanwhile, the first friction material 8 is not in contact with the rolling body 52 of the one-way clutch. The second friction material 9 is, for example, made of carbon cloth.

The operating member 7 is disposed inside the second reel body portion 22. A portion of the operating member 7 is exposed from the outer perimeter surface of the second reel body portion 22. The operating member 7 is rotatable about the spool shaft 4. When this operating member 7 is rotated, the braking force of the first and second friction materials 8, 9 is adjusted with respect to the outer ring 51.

In particular, the operating member 7 comprises a rotating member 71 and a gear member 72. The rotating member 71 is rotatably attached about the spool shaft 4. The rotating member 71 is rotated relative to the spool shaft 4. Further, the rotating member 71 is rotated relative to the outer ring 51 of the one-way clutch 5.

The rotating member 71 comprises a gear portion 71a on the outer perimeter surface thereof. Further, the rotating member 71 is a substantially cylindrical shape, and comprises a disc portion 71b and a cylindrical portion 71e. The disc portion 71b comprises a through-hole in the center, and the spool shaft 4 extends through the disc portion 71b via this through-hole.

The cylindrical portion 71c extends from the outer perimeter edge of the disc portion 71b in the axial direction. In particular, the cylindrical portion 71c extends toward the attaching portion 24. The cylindrical portion 71c has a large-diameter portion and a small-diameter portion, but is not particularly limited to this shape. A gear portion 71a is formed on the outer perimeter surface of this cylindrical portion 71c. The one-way clutch 5 is disposed in the cylindrical portion 71c. Further, a female threaded portion is formed on the inner perimeter surface of the cylindrical portion 71c. The female threaded portion of this cylindrical portion 71c is attached to the male threaded portion of the attaching portion 24. Accordingly, the rotating member 71 is moved in the axial direction when rotated.

Figure 3:
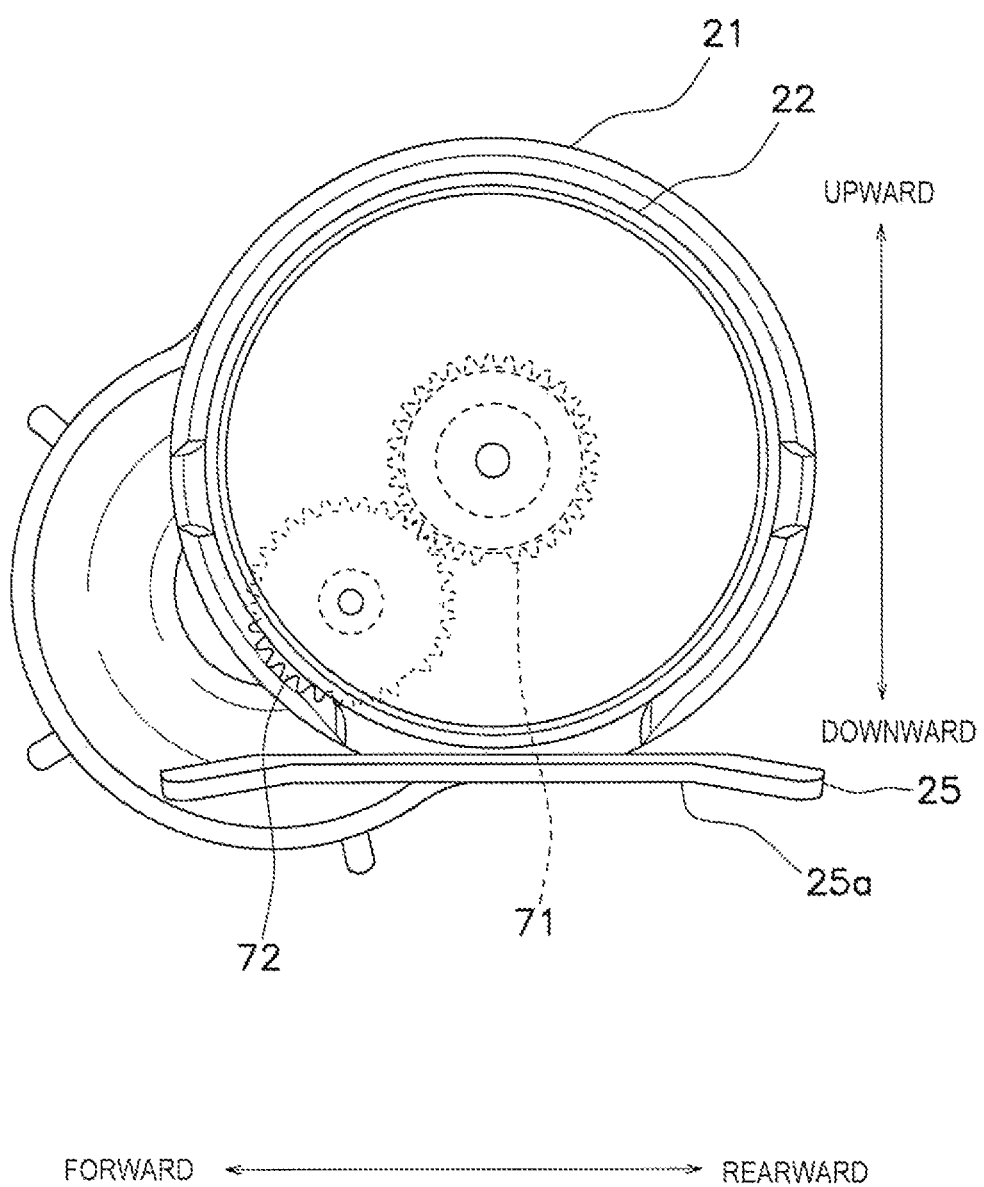
FIG. 3 is a side view of the dual-bearing reel of FIG. 1.

The gear member 72 meshes with the gear portion 71a of the rotating member 71. A portion of the gear member 12 is exposed from the outer perimeter surface of the second reel body portion 22. In particular, as shown FIG. 3, a portion of the gear member 72 is exposed forward and downward from the outer perimeter surface of the second reel body portion 22. The gear member 72 is rotatably attached to the second reel body portion 22. Meanwhile, "forward" means the direction in which the fishing line is cast. Further, rearward means the direction opposite to the direction in which the fishing line is cast (i.e., the direction in which the fishing line is reeled).

As shown in FIG. 2, if the exposed portion of the gear member 72 is operated to rotate the gear member 72, the rotating member 71 is also rotated. Since the rotating member 71 is attached to the attaching portion 24, the rotating member 71 is moved in the axial direction when rotated. The force with which the first friction material 8 is pressed to the outer ring 51 can be adjusted by the rotating member 71 moving in the axial direction. That is, the braking force by the first friction material 8 is adjusted by rotating the operating member 7.

As shown in FIG. 1, the handle 10 is attached to the first reel body portion 21. When the handle 10 is rotated, the spool shaft 4 is rotated via the rotation transmission mechanism.

Next, the operation of the dual-bearing reel 100 will be described. At the time of casting in which a fishing line is unreeled from the spool 3, the spool shaft 4 is rotated in the line delivering (casting) direction. The rotation of this spool shaft 4 in the casting direction is transmitted to the outer ring 51 via the rotating body 52 of the one-way clutch 5, thereby rotating the carter ring 51. Since the rotation of the outer ring 51 is braked by the braking force of the first friction material 8, the rotation speed of the outer ring 51 is suppressed. Since the outer ring 51 and the spool shaft 4 are interlocked, the rotation speed of the spool shaft 4 at the time of casting is also suppressed, and backlash is prevented.

The braking force with respect to the spool shaft 4 is adjusted by rotating the operating member 7. Specifically, if the gear member 72 is rotated, the rotating member 71 is moved in the axial direction. The force with which the first friction material 8 presses the outer ring 51 can be adjusted by the movement of this rotating member 71. As a result, the frictional force between the first friction material 8 and the outer ring 51 is adjusted, and thus the braking force of the first friction material 8 with respect to the spool shaft 4 is adjusted. In this manner, it is possible to adjust the braking force by the first friction material 8 with respect to the spool shaft 4, by rotating the operating member 7. Further, since a portion of the operating member 7, that is, a portion of the gear member 72 is exposed front the outer perimeter surface of the second reel body portion 22, it is possible to operate the operating member 7 while palming.

When winding the fishing line, the spool shaft 4 is rotated in the line reeling direction. The rolling body 52 does not transmit the rotation of the spool shaft 4 in the line reeling direction to the outer ring 51. That is, the spool shaft 4 and the outer ring 51 will not be interlocked, and the braking force by the first friction material 8 will not act on the spool shaft 4. Therefore, the rotational resistance by the first friction material 8 will not be generated in the spool shaft 4 at the time of line winding, and the spool shaft 4 can be rotated smoothly.

One embodiment of the present invention was described above, but the present invention is not limited to the above-described embodiment, and various modifications can be made without departing from the scope of the invention.

Modified Example 1

Figure 4:
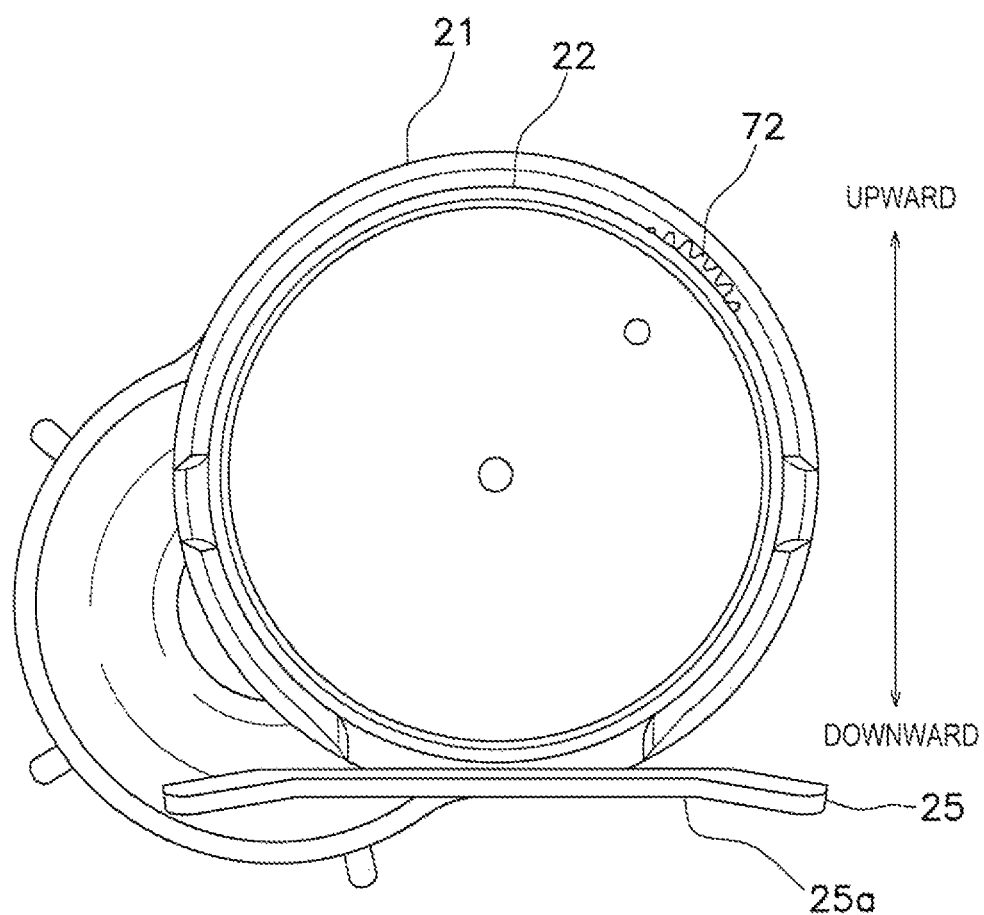
FIG. 4 is a side view of a dual-bearing reel according to a modified example.

The position in which a portion of the operating member 7 is exposed from the outer perimeter surface of the second reel body portion 11 may be changed. For example, as shown in FIG. 4, a portion of the operating member 7 may be exposed from the outer perimeter surface of the second reel body portion 22 so as to be oriented rearward and upward.

Modified Example 2

The first friction material 8 brakes the rotation of the spool shaft 4 via the one-way clutch 5, but may omit the one-way clutch 5 and directly brake the rotation of the spool shaft 4.

Modified Example 3

Figure 5:
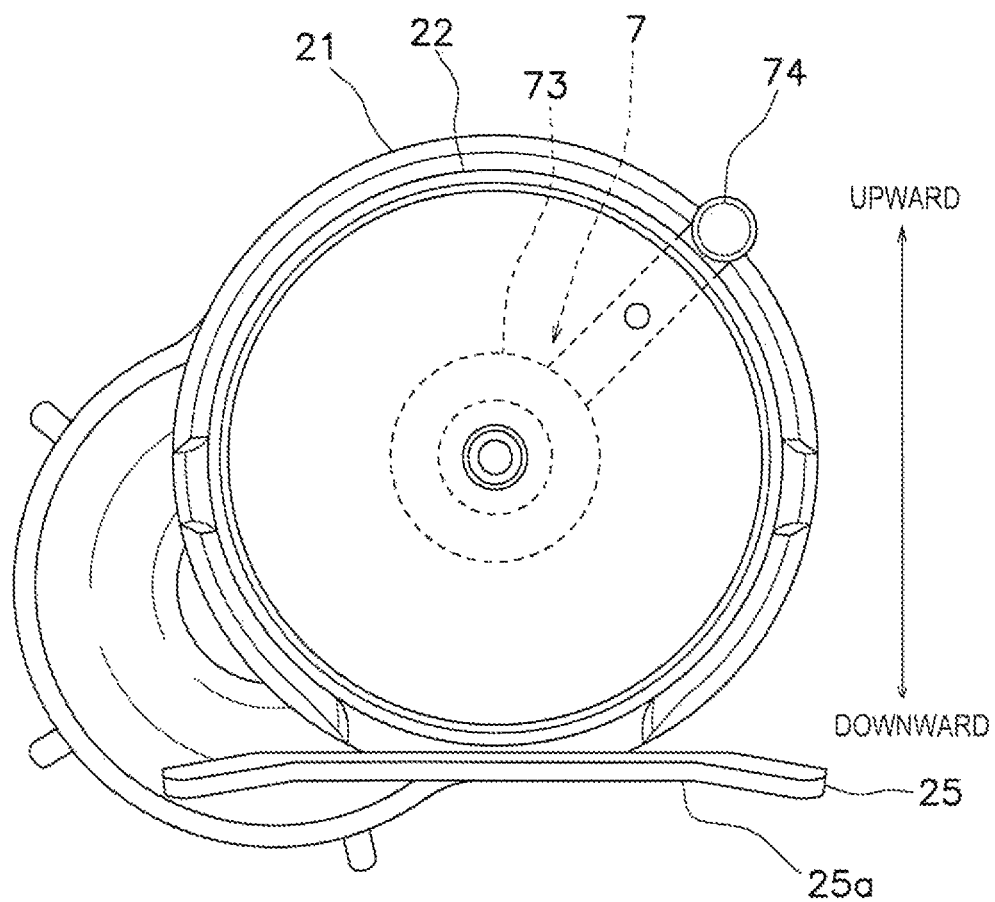
FIG. 5 is a side view of a dual-bearing reel according to a modified example.

In the above-described embodiment, the operating member 7 comprises a rotating member 71 and a gear member 72, but the configuration of the operating member 7 is not limited thereto. For example, as shown in FIG. 5, the operating member 7 comprises a rotating portion 73 and a lever portion 74. Unlike the rotating member 71 of the embodiment described above, the rotating portion 73 does not comprise a gear portion 71a on the outer perimeter surface thereof; however, the other configurations are substantially the same as the rotating member 71 of the above-described embodiment. Specifically, the rotating portion 73 is rotatably disposed about the spool shaft 4. Further, the rotating portion 73 is attached to the attaching portion 24. The rotating portion 73 presses the outer ring 51 via the first friction material 8.

The lever portion 74 extends from the rotating portion 73 in the radial direction. Then, a portion of the lever portion 74 is exposed from the outer perimeter surface of the second reel body portion 22. The lever portion 74 is integrally formed with the rotating portion 73. The rotating portion 73 is rotated about the spool shaft 4 by pivoting the lever portion 74. As a result, the rotating portion 73 is moved in the axial direction, and the frictional force of the first friction material 8 with respect to the spool shaft 4 is adjusted.

What is claimed is:

1. A dual-bearing reel, comprising:
   a reel body having a first reel body portion and a second reel body portion;
   a handle attached to the first reel body portion;
   a spool disposed between the first reel body portion and the second reel body portion;
   a spool shaft configured to integrally rotate with the spool;
   a friction material configured to brake rotation of the spool shaft by frictional force; and
   an operating member disposed so as to rotate about the spool shaft in the second reel body portion, a portion of the operating member being exposed from an outer perimeter surface of the second reel body portion, and the operating member being operatably configured to adjust the braking force by the first friction material by being operated.

2. A dual-bearing reel, comprising:
   a reel body having a first reel body portion and a second reel body portion;
   a handle attached to the first reel body portion;
   a spool disposed between the first reel body portion and the second reel body portion;
   a spool shaft configured to integrally rotate with the spool;
   a friction material configured to brake rotation of the spool shaft by frictional force; and
   an operating member rotatably disposed about the spool shaft in the second reel body portion, a portion of the operating member being exposed from an outer perimeter surface of the second reel body portion, and the operating member being operatably configured to adjust the braking force by the first friction material by being operated, the operating member comprising a rotating member having a gear portion on an outer perimeter surface thereof, the rotating member beings rotatably disposed about the spool shaft, and a gear member configured to mesh with the gear portion of the rotating member, a portion of the gear member being exposed from the outer perimeter surface of the second reel body portion.

3. The dual-bearing reel recited in claim 2, wherein the rotating member is attached to the second reel body portion in an axial direction.

4. The dual-bearing reel recited in claim 1, wherein the operating member comprises a rotating portion rotatably disposed about the spool shaft, and a lever portion extending from the rotating portion radially outwardly, and a portion of the lever portion being exposed from the outer perimeter surface of the second reel body portion.

5. The dual-bearing reel recited in claim 4, wherein the rotating member is attached to the second reel body portion in an axial direction.

6. The dual-bearing reel recited in claim 1, further comprising a one-way clutch comprising an outer ring configured to be braked by the friction material, and a rolling body configured to transmit the rotation of the spool shaft in a casting direction to the outer ring.

7. The dual-bearing reel recited in claim 6, wherein the friction material is disposed between the outer ring and the operating member in an axial direction.

* * * * *